(12) United States Patent
Song

(10) Patent No.: US 6,741,314 B2
(45) Date of Patent: May 25, 2004

(54) LIQUID CRYSTAL DISPLAY WITH HIGH APERATURE RATIO

(75) Inventor: Jang-Kun Song, Seoul (KR)

(73) Assignee: Samsung Electronics Co. Ltd. (KR)

( * ) Notice: Subject to any disclaimer, the term of this patent is extended or adjusted under 35 U.S.C. 154(b) by 95 days.

(21) Appl. No.: 10/217,977

(22) Filed: Aug. 13, 2002

(65) Prior Publication Data

US 2003/0107694 A1 Jun. 12, 2003

(30) Foreign Application Priority Data

Dec. 10, 2001 (KR) ........................................ 2001-77839

(51) Int. Cl.[7] ...................... G02F 1/1337; G02F 1/1343
(52) U.S. Cl. ........................ 349/144; 349/129; 349/142
(58) Field of Search ................................. 349/129, 142, 349/144

(56) References Cited

U.S. PATENT DOCUMENTS 6,256,080 B1 * 7/2001 Colgan et al. .............. 349/129
6,593,988 B1 * 7/2003 Liu et al. .................... 349/129
6,600,539 B2 * 7/2003 Song ........................... 349/130

* cited by examiner

*Primary Examiner*—Julie-Huyen L. Ngo
(74) *Attorney, Agent, or Firm*—Cantor Colburn LLP

(57) ABSTRACT

A liquid crystal display includes a bottom substrate, and gate and data lines formed on the bottom substrate while intersecting each other to define pixel regions. A pixel electrode is formed at each pixel region while being partitioned into a plurality of partitions by way of an opening pattern. A thin film transistor is connected to the pixel electrode, the gate line, and the data line. A top substrate faces the bottom substrate with a common electrode. The common electrode has an opening pattern for partitioning the plurality of partitions into a plurality of micro domains. The micro domains are classified into first and second horizontal micro domains and first vertical micro domains depending upon the average direction of the liquid crystal molecules within the relevant regions. The second horizontal micro domains are arranged between the first vertical micro domains and the data lines placed at the left and right sides of the first vertical micro domains.

10 Claims, 9 Drawing Sheets

LIQUID CRYSTAL DISPLAY WITH HIGH APERATURE RATIO

BACKGROUND OF THE INVENTION (a) Field of the Invention

The present invention relates to a liquid crystal display and, more particularly, to a vertically aligned liquid crystal display which partitions the pixel region into a plurality of micro domains using a domain partitioning member to thereby make a wide viewing angle.

(b) Description of the Related Art

Generally, a liquid crystal display ("LCD") has a top panel with a common electrode and color filters, a bottom panel with thin film transistors ("TFTs") and pixel electrodes, and a liquid crystal layer sandwiched between the two panels. Different potentials are applied to the pixel electrodes and the common electrode to generate an electric field, which reorients the liquid crystal molecules, thereby controlling the transmittance of light to display images.

The LCD often involves a critical shortcoming of a narrow viewing angle. In order to solve such a problem, various techniques of widening the viewing angle have been developed. For instance, it has been proposed that the liquid crystal molecules may be aligned perpendicular to the top and the bottom panels while forming a predetermined pattern of openings or protrusions at the pixel electrodes and the common electrode.

When utilizing the opening pattern, for example, the tilt directions of the liquid crystal molecules are controlled by way of a fringe field generated by the openings provided both at the pixel electrodes and the common electrode, thereby widening the viewing angle.

When utilizing the protrusion pattern, on the other hand, protrusions are formed on the pixel electrodes and the common electrode provided on the top and the bottom panels, and the tilt directions of the liquid crystal molecules are controlled by way of an electric field deformed by the protrusions.

Furthermore, an opening pattern may be formed in the pixel electrodes of the bottom panel while forming a protrusion pattern on the common electrode of the top panel. The tilt directions of the liquid crystal molecules are controlled by way of the fringe field generated by the openings and the protrusions while forming a plurality of micro domains.

The LCD also often involves a shortcoming of low brightness in which the visibility becomes deteriorated at a place where circumferential light is strong. In order to enhance the brightness of the LCD, the light transmittance or the occupation ratio of the light transmission area (the aperture ratio) should be increased as much as possible. Particularly, for the LCD having pixel regions partitioned into a plurality of micro domains by domain partitioning members to thereby obtain a wide viewing angle, the aperture ratio should be increased to enhance the brightness since the light is blocked by the domain partitioning member.

In order to increase the aperture ratio, it is required that the area of the pixel electrode should be widened as much as possible while minimizing the width of the black matrix.

However, when the area of the pixel electrode is large, the distance between the neighboring pixel electrodes becomes short so that the voltages applied thereto influence each other to generate a strong fringe field near the borderline area. Such a fringe field helps forming domains where the long axes of the liquid crystal molecules are inclined perpendicular to the boundary of the pixel electrode, but hinders the domain formation where the long axes of the liquid crystal molecules are inclined parallel to the boundary of the pixel electrode. With the hindrance of the domain formation, the inclining directions of the liquid crystal molecules are dispersed, and correspondingly, texture is made at the display screen. To summarize, when the pixel electrode becomes widened, the texture increases. As shown in FIG. 7, the texture is seriously intensified at the left and right bottom sides (the A area) of the pixel. Furthermore, as shown in FIG. 8, it is expected that the texture be made in a shape of a half circle at the left and right sides (the B area) of the pixel. Meanwhile, as the width of the black matrix becomes minimized, the black matrix cannot screen the texture, resulting in deteriorated picture quality.

SUMMARY OF THE INVENTION

The invention provides an LCD where horizontal domains are arranged at both sides of the vertical domains.

In one embodiment, the liquid crystal display has a first insulating substrate, first signal lines formed on the first insulating substrate, and second signal lines formed at the first insulating substrate intersecting the first signal lines in an insulating manner. A pixel electrode is formed at each pixel region delimited by the intersection of the first and the second signal lines while being partitioned into a plurality of partitions by way of a first domain partitioning member. A thin film transistor is connected to the first and the second signal lines and to the pixel electrode. A second insulating substrate faces the first insulating substrate. A common electrode is formed on the second insulating substrate with a second domain partitioning member for partitioning the plurality of partitions into a plurality of micro domains. The micro domains have first and second horizontal micro domains and first vertical micro domains classified depending upon the average direction of the liquid crystal molecules within the relevant domains. The second horizontal micro domains are arranged between the first vertical micro domains and the second signal lines placed at the left and right sides of the first vertical micro domains. The first horizontal micro domains are disposed at at least one of the top and bottom sides of the first vertical micro domains.

The micro domains further have second vertical micro domains, disposed at at least one of the top and bottom sides of the first horizontal micro domains. The distance between the two neighboring second signal lines is varied repeatedly along a length of the lines, and the side of the pixel electrode close to the second signal line is outlined with the same pattern as the second signal line such that the pixel electrode has a narrow part and a wide part. The narrow part of the pixel electrode is partitioned into the first horizontal micro domains and the second vertical micro domains by way of the first and the second domain partitioning members, and the wide part of the pixel electrode is partitioned into the first vertical micro domains and the second horizontal micro domains by way of the first and the second domain partitioning members.

Third signal lines are formed at the first substrate while intersecting the second signal lines in an insulating manner. Subsidiary storage capacitor electrodes overlap the third signal lines in an insulating manner while being electrically connected to the pixel electrodes. The subsidiary storage capacitor electrode overlaps the second domain partitioning member.

The second domain partitioning member, in one embodiment, is an opening pattern formed at the common electrode while bearing a horizontal opening and a vertical opening. The horizontal opening has a first section including a first end with two branches and an opposite second end with two branches so as to form two of the first vertical domains and two of the second horizontal domains.

In another embodiment, the liquid crystal display includes a first insulating substrate, and a gate wire formed on the first insulating substrate with gate lines and gate electrodes. A gate insulating layer is formed on the gate wire. A semiconductor layer is formed on the gate insulating layer. A data wire is formed on the semiconductor layer with data lines, source electrodes and drain electrodes. The data lines intersect the gate lines. A protective layer is formed on the data wire having contact holes exposing the drain electrodes. Pixel electrodes are formed on the protective layer. Each pixel electrode partially overlaps the data line and the gate line while being partitioned into a plurality of partitions by way of a first opening pattern. A second insulating substrate faces the first insulating substrate. A common electrode is formed on the second insulating substrate having a second opening pattern for partitioning the plurality of partitions into a plurality of micro domains. A liquid crystal layer is sandwiched between the pixel electrode and the common electrode. The micro domains include first and second horizontal micro domains and first vertical micro domains classified depending upon the average direction of the liquid crystal molecules within the relevant domains. The second horizontal micro domains are arranged between the first vertical micro domains and the data lines placed at the left and right sides of the first vertical micro domains. The first horizontal micro domains are disposed at at least one of the top and bottom sides of the first vertical micro domains.

The protective layer, in one embodiment, is formed with a low dielectric CVD layer having a thickness of 2–4 microns.

BRIEF DESCRIPTION OF THE DRAWINGS

The above advantages of the present invention will become more apparent by describing preferred embodiments thereof in detail with reference to the accompanying drawings in which.

DETAILED DESCRIPTION OF THE PREFERRED EMBODIMENTS

Figure 1:
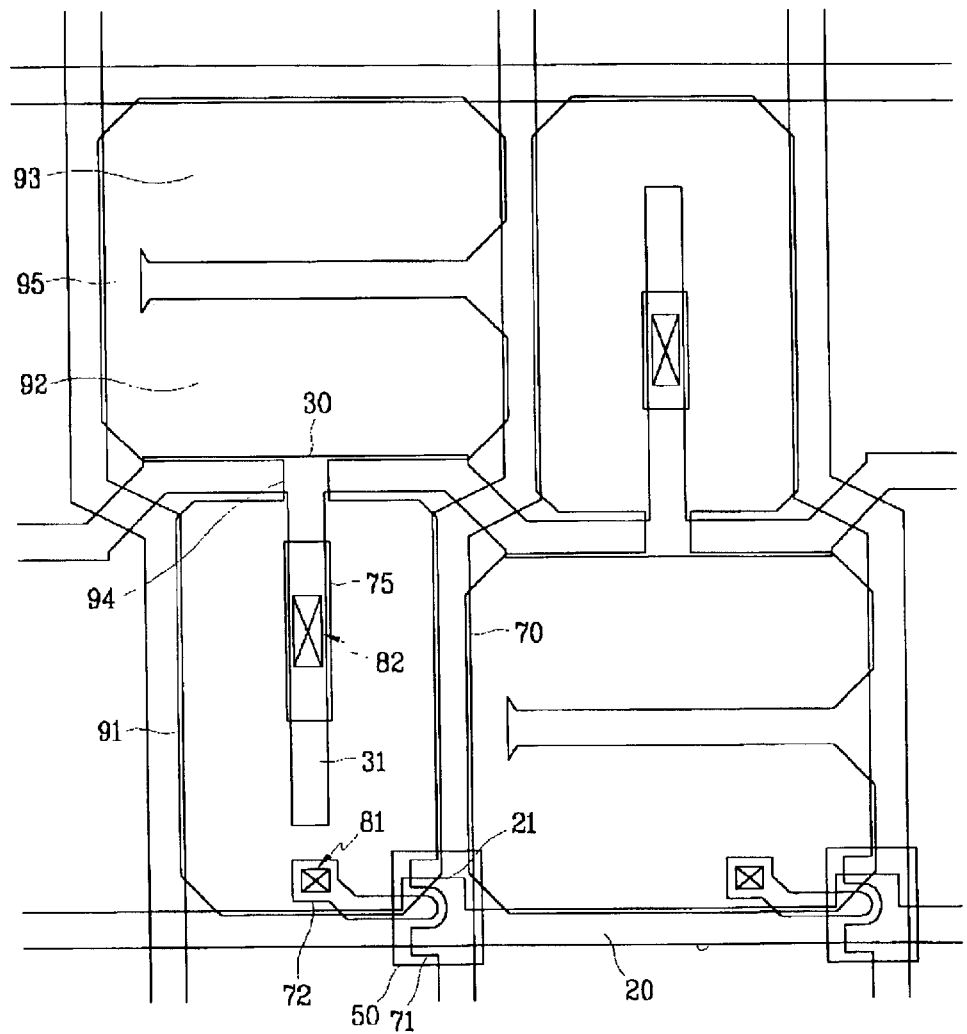
FIG. 1 is a plan view of a TFT array panel for an LCD according to a first embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present. Then, liquid crystal displays according to embodiments of the present invention will be described with reference to the drawings.

Figure 2:
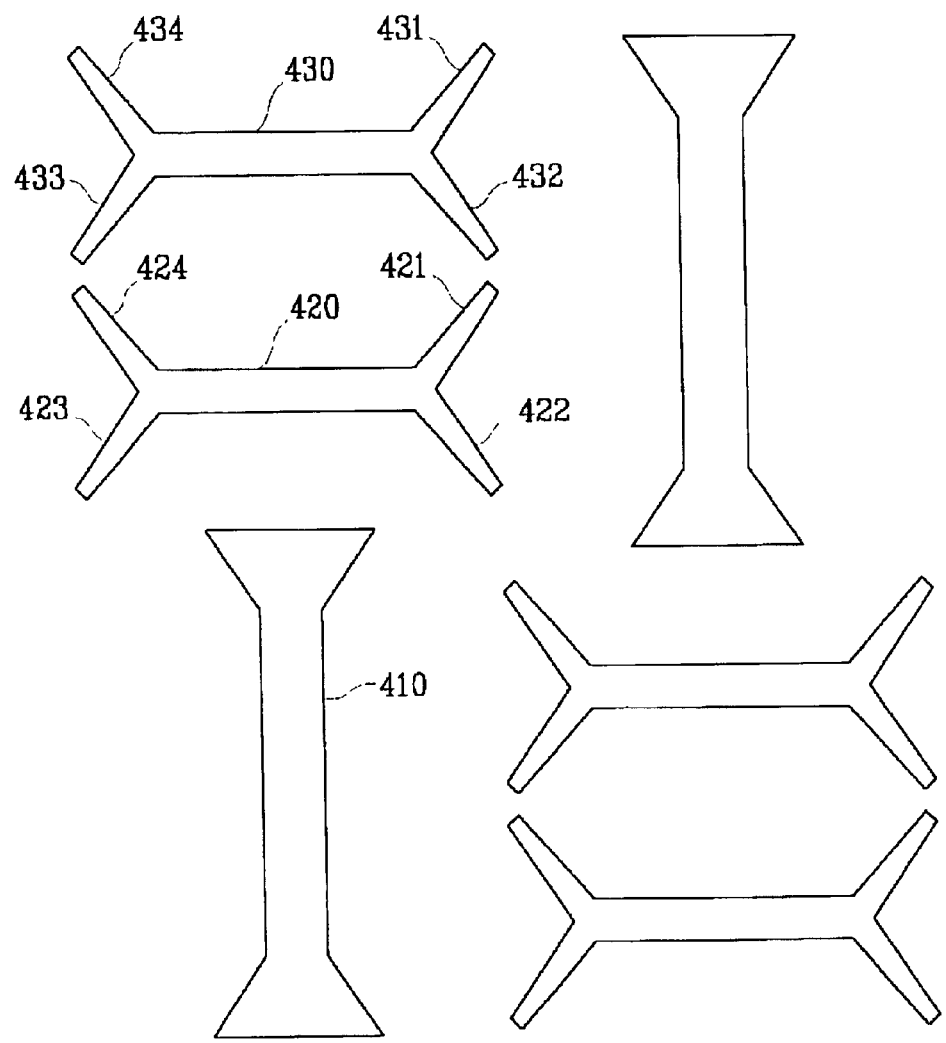
FIG. 2 is a plan view of a color filter panel for the LCD according to the first embodiment.
Figure 3:
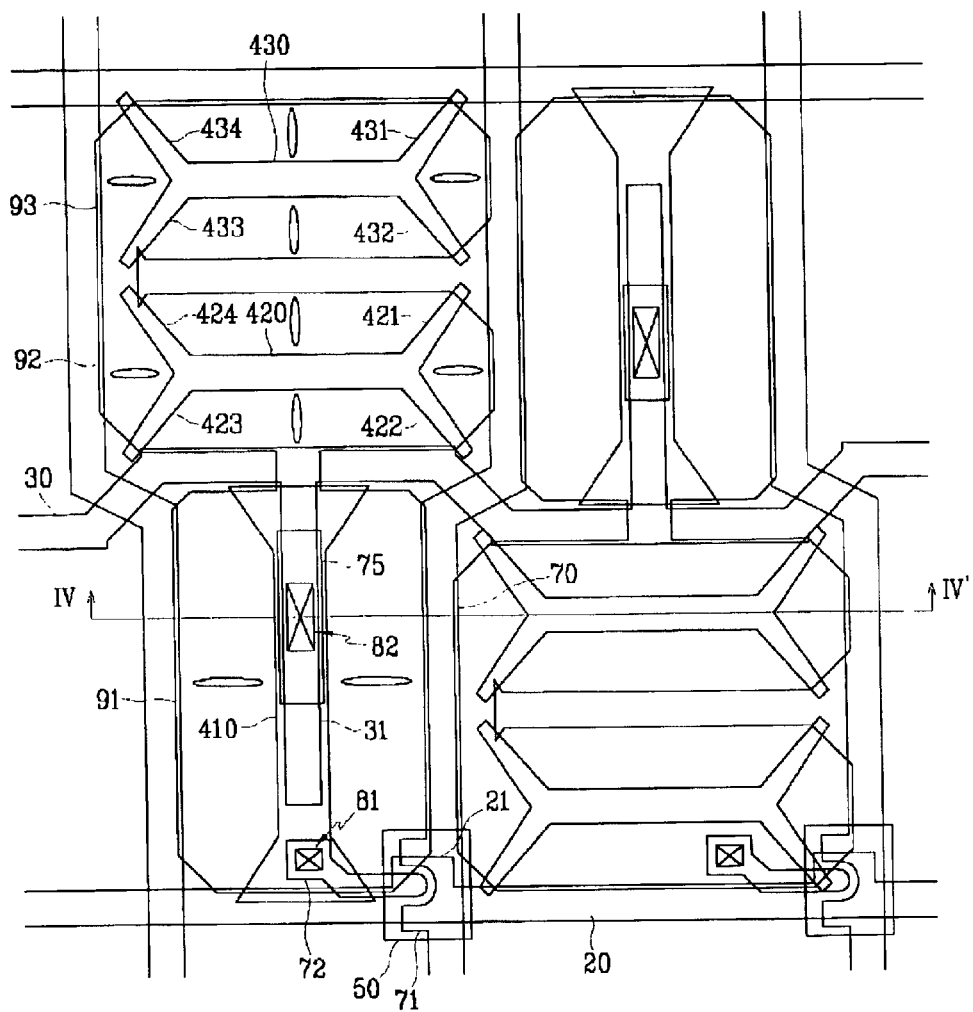
FIG. 3 illustrates a pixel electrode and a common electrode for the LCD according to the first embodiment when viewed from the front side.
Figure 4:
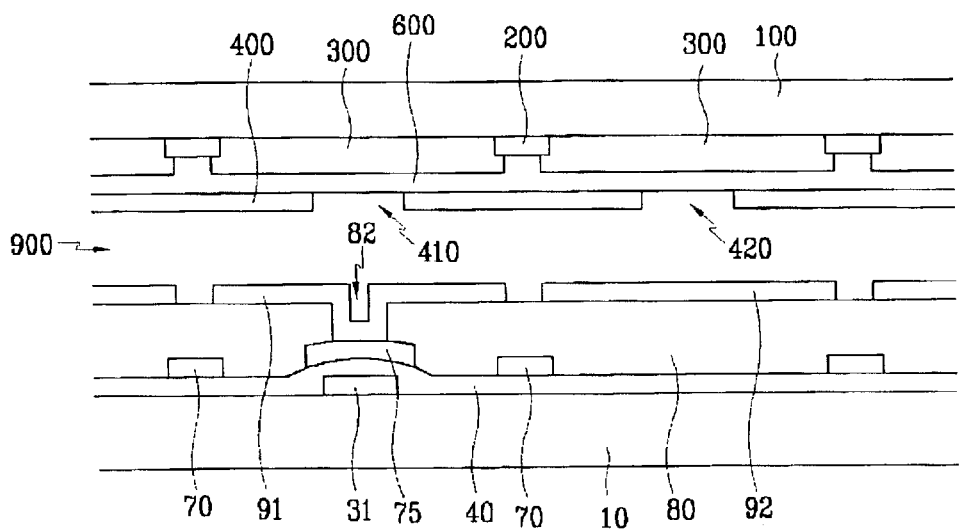
FIG. 4 is a cross sectional view of the LCD taken along the IV–IV' line of FIG. 3.

FIG. 1 is a plan view of a TFT array panel for an LCD according to a first preferred embodiment of the present invention, FIG. 2 is a plan view of a color filter panel for the LCD, FIG. 3 illustrates a pixel electrode and a common electrode for the LCD when viewed from the front side, and FIG. 4 is a cross sectional view of the LCD taken along the IV–IV' line of FIG. 3.

In the TFT array panel, gate lines 20 and storage capacitor lines 30 are formed on an insulating substrate 10 while extending in the horizontal direction. Gate electrodes 21 are protruded from the gate lines 20, and storage capacitor electrodes 31 are branched from the storage capacitor lines 30. The storage capacitor lines 30 extend nonlinearly. That is, the storage capacitor lines 30 include bars alternately arranged so that they are slightly deviated up and down from an imaginary horizontal rectilinear line, and connectors interconnecting the bars. The storage capacitor electrodes 31 extend in the vertical direction.

A gate insulating layer 40 is formed on the gate wire 20 and 21 and the storage capacitor wire 30 and 31.

A semiconductor layer 50 preferably made of semiconductor such as hydrogenated amorphous silicon is formed on the gate insulating layer 40. The semiconductor layer 50 overlaps the gate electrodes 21.

An ohmic contact layer (not shown) preferably made of n+ hydrogenated amorphous silicon doped with n-type high-concentration impurities is formed on the semiconductor layer 50. The ohmic contact layer is separated into two portions with respect to the gate electrode 21.

A data wire 70, 71 and 72 and subsidiary storage capacitor electrodes 75 are formed on the ohmic contact layer. The data wire includes data lines 70 extending in the vertical direction. The data lines 70 extend nonlinearly. That is, the data lines 70 includes a plurality of bars alternately arranged so that they are slightly deviated up and down from an imaginary rectilinear line, and connectors interconnecting the bars. The deviation between the neighboring bars is adjusted depending upon the occupation ratios of the upper and lower domains and the left and right domains. The two neighboring data lines 70 are reversed in the order of leftward and rightward deviations so that a narrow portion and a wide portion are alternately arranged between the two data lines 70. This is the same in the horizontal direction as in the vertical direction. The data lines 70 intersect the storage capacitor lines 30 and the gate lines 20. The intersection of the data lines 70 and the storage capacitor lines 30 is made at the connectors thereof. Furthermore, the subsidiary storage capacitor electrodes 75 are separated from the data wire 70, 71 and 72 while overlapping the storage capacitor electrodes 31.

A protective layer 80 preferably made of low dielectric insulating layer with a thickness of 2–4 um is formed on the data wire 70, 71 and 72 and the subsidiary electrodes 75. Examples of low dielectric insulating layer are a-Si:C:O layer and an a-Si:O:F layer (the low dielectric CVD layers) deposited by plasma enhanced chemical vapor deposition (PECVD). The a-Si:C:O or a-Si:O:F layer bears an extremely low dielectric constant of four or less (for example, the dielectric constant ranging from two to four). The protective layer 80 involves a first contact hole 81 and a second contact hole 82 partially exposing the drain electrode 72 and the subsidiary electrode 75, respectively.

A pixel electrode 91 to 95 preferably made of indium tin oxide (ITO) or indium zinc oxide (IZO) is formed on the protective layer 80 at each pixel region surrounded by the neighboring two gate lines 20 and data lines 70. The pixel electrode 91 to 95 is connected to the drain electrode 72 and the subsidiary electrode 75 through the first and the second contact holes 81 and 82. The subsidiary electrode 75 connected to the pixel electrode 91 to 95 overlaps the storage capacitor electrode 31 while interposing only the gate insulating layer 40.

The pixel electrode 91 to 95 has a wide part and a narrow part as outlined with the shape of the pixel region, and is separated into three partitions 91 to 93 interconnected by connectors 94 and 95. The first partition 91 is formed at the narrow part of the pixel region, and has a rectangular shape with four chamfered corners. The second and the third partitions 92 and 93 with rectangular shapes are formed at the wide part of the pixel region. It is preferable that the corners of the second and the third partitions 92 and 93 are also chamfered. The second partition 92 is connected to the first partition 91 via the first connector 94, and the third partition 93 is connected to the second partition 92 via the second connector 95. As described above, as the pixel region involves a wide part and a narrow part, the domain width as well as the width and the number of the domain partitioning members can be optimized while enhancing the aperture ratio.

In order to form a predetermined strength of fringe field, the domain width and the width of the domain partitioning members should be adjusted to predetermined dimensions. However, it is difficult to adjust the dimensions for the rectangular-shaped pixel region. On the contrary, for the pixel region with a part of a large width and a part of a small width, it is varied in the width when needed so that the domain width and the width of the domain partitioning members can be easily optimized. Furthermore, the number of the domain partitioning members can be minimized. The measurement indicates that the LCD with a rectangular-shaped pixel region bears an aperture ratio of 36%, whereas the LCD according to the present invention bears an aperture ratio of 48%.

The respective partitions 91 to 93 of the pixel electrode 91 to 95 are so wide as to partially overlap the data line 70 and the gate line 20. This is to increase the aperture ratio as much as possible. Since the pixel electrode 91 to 95 is wide, the distance between the neighboring pixel electrodes may approach 5 microns. However, when the pixel electrode 91 to 95 overlaps the data line 70, the image quality is liable to be deteriorated due to the signal interference. As the data line 70 and the pixel electrode 91 to 95 are spaced apart from each other via the protective layer 80 bearing a low dielectric constant and a large thickness, the cross talk therebetween is reduced significantly so as to no longer induce any problem.

A color filter panel for the LCD will be now explained with reference to FIGS. 2 and 4.

A black matrix 200 preferably having a double layered structure of chrome/chrome oxide is formed on a transparent glass substrate 100. Color filters of red, green and blue 300 are formed at the respective pixel regions. An overcoat film 600 covers the color filter 300, and a common electrode 400 preferably made of a transparent conductive material is formed on the overcoat film 600. An opening pattern with first to third openings 410, 420 and 430 is formed at the common electrode 400. The first opening 410 bisects the narrow part of the pixel region horizontally. Both ends of the first opening 410 are gradually enlarged while forming an isosceles. The second opening 420 has four branches 421 to 424, and the third opening 430 also has four branches 431 to 434. The second and the third openings partition the wide part of the pixel region into seven micro domains horizontally as well as vertically.

Meanwhile, the black matrix 200 may be made of an organic material containing black pigment instead of a metal such as chrome. Furthermore, in order to enhance the aperture ratio, the black matrix 200 is established to bear a minimized width of about 8 microns in consideration of the alignment error.

The LCD will be further explained with reference to FIGS. 3 and 4.

The TFT array panel shown in FIG. 1 and the color filter panel shown in FIG. 2 are aligned, and combined with each other. A liquid crystal layer 900 is sandwiched between the two panels such that the directors of the liquid crystal molecules therein are aligned perpendicular to the panels. Two polarizing plates (not shown) are externally attached to the substrates 10 and 100, and a compensation film (not shown) is attached thereto.

The partitions 91 to 93 of the pixel electrode 90, and the first to third openings 410, 420 and 430 of the common electrode 400 overlap each other to partition the pixel region into a plurality of micro domains. The micro domains partitioned by the boundaries of the first partition 91 and the first opening 410, called the "first horizontal domains," have two short sides, and two long sides extending parallel to the data line 70. The micro domains partitioned by the boundaries of the second and the third partitions 92 and 93 and the second and the third openings 420 and 430 include vertical domains having two short sides and two long sides extending parallel to the gate line 20, and second horizontal domains positioned at both ends of the vertical domains. The second horizontal domains are domains partitioned by the branches 421 to 424 and 431 to 434 of the second and the third openings 420 and 430 and the left and right sides of the second and third partitions 92 and 93. The horizontal domains refer to the micro domains where the average direction of the long axes of the liquid crystal molecules is horizontally inclined (parallel to the gate line), and the vertical domains refer to the micro domains where the average direction of the long axes of the liquid crystal molecules is vertically inclined (parallel to the data line).

Meanwhile, the partitions 91 to 93 of the pixel electrode 90 have two long sides and two short sides. The long side of each partition extends parallel to the data line or the gate line, while being angled with respect to the polarizing axis of the polarizing plate by, for example, 45°.

When the pixel partitions 91 to 95 and the openings 410, 420 and 430 are arranged in such a way, the texture due to the close distance between the neighboring pixel electrodes can be removed.

Figure 6A:
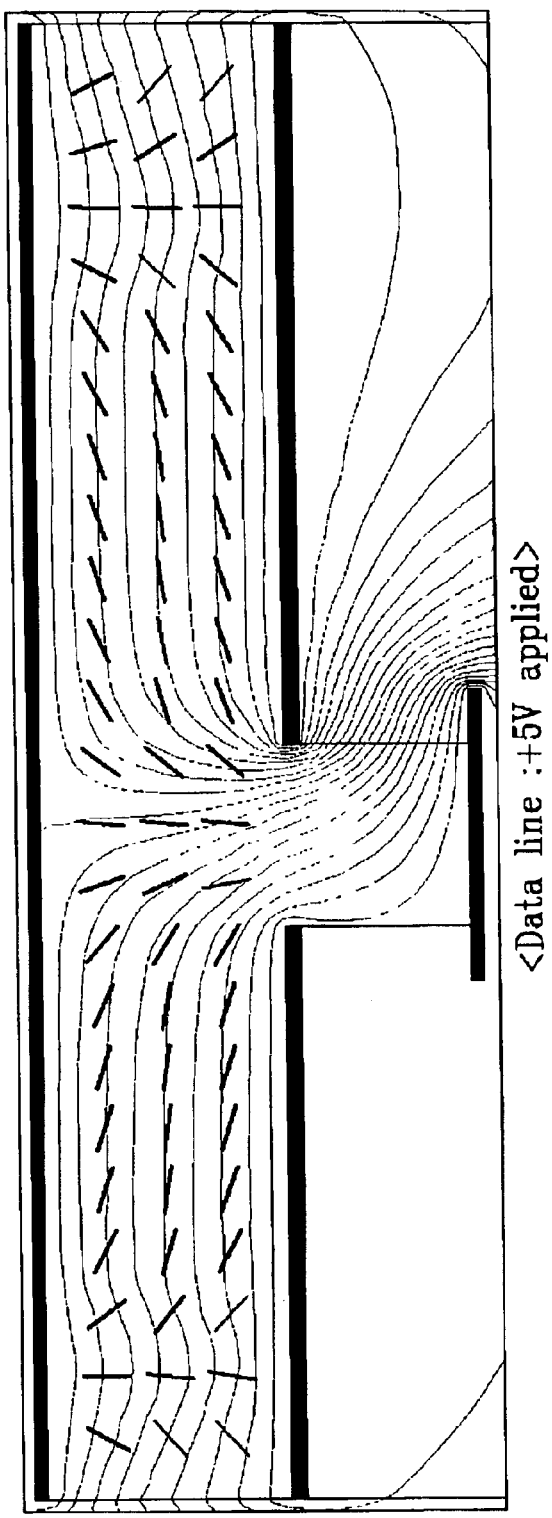
FIG. 6A simulates the equipotential lines and the arrangement of the liquid crystal molecules when −5V and 5V are applied to the left and right pixel electrodes, and −5V is applied to the data line.
Figure 6B:
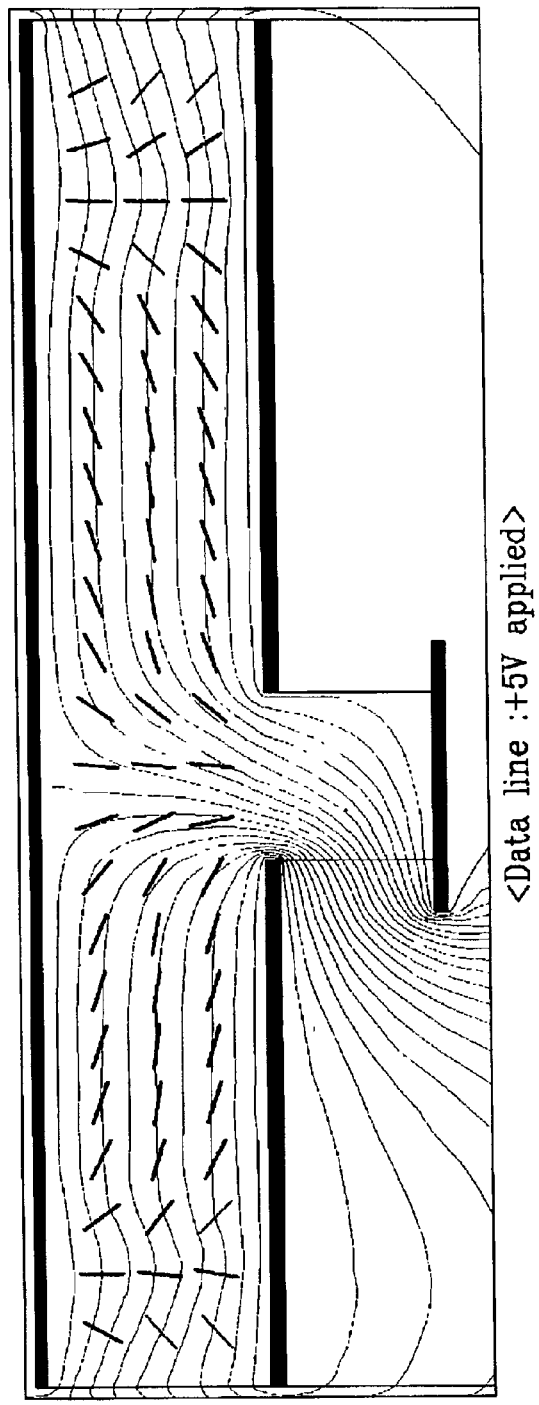
FIG. 6B simulates the equipotential lines and the arrangement of the liquid crystal molecules when −5V and 5V are applied to the left and right pixel electrodes, and 5V is applied to the data line.

As described above, when the pixel electrode is formed in a wide manner, the distance between the neighboring pixel electrodes becomes shortened so that the voltages thereof influence each other while forming a strong fringe field at the boundary thereof. FIGS. 6A and 6B illustrate such a fringe field. As shown in FIGS. 6A and 6B, the formation of the fringe field is made in the direction perpendicular to the boundary of the pixel electrode irrespective of the data line voltage. Such a fringe field operates to serve the domain formation at the domains where the directors of the liquid crystal molecules are inclined perpendicular to the boundary of the pixel electrode. By contrast, the fringe field operates to hinder the domain formation at the domains where the directors of the liquid crystal molecules are inclined parallel to the boundary of the pixel electrode. With the hindrance of the domain formation, the inclining directions of the liquid crystal molecules are dispersed, and correspondingly, texture is made on the display screen. Therefore, as the pixel electrode is formed in a wide manner, the texture is increased, as indicated by the A portion of FIG. 7 and the B portion of FIG. 8.

Figure 7:
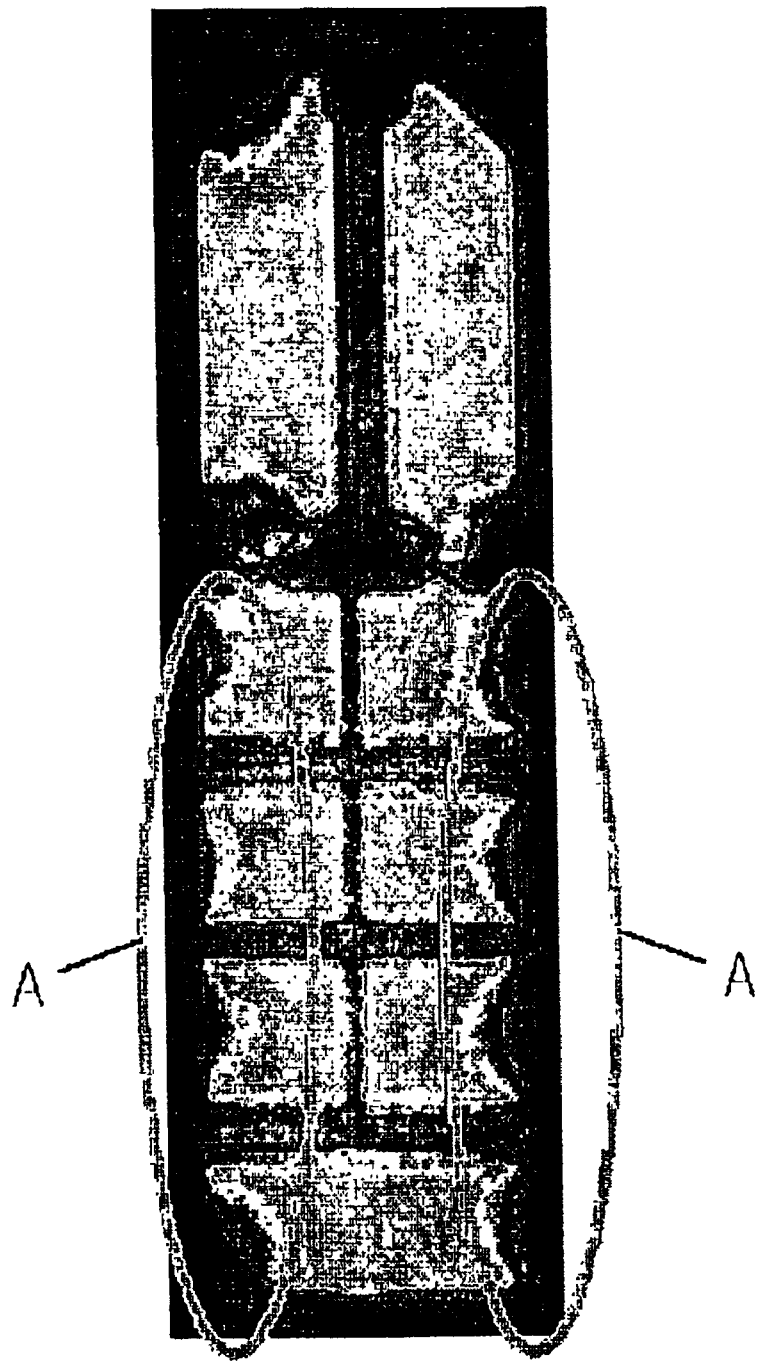
FIGS. 7 and 8 are photographs illustrating the textures in an ultra-high aperture ratio LCD.
Figure 8:
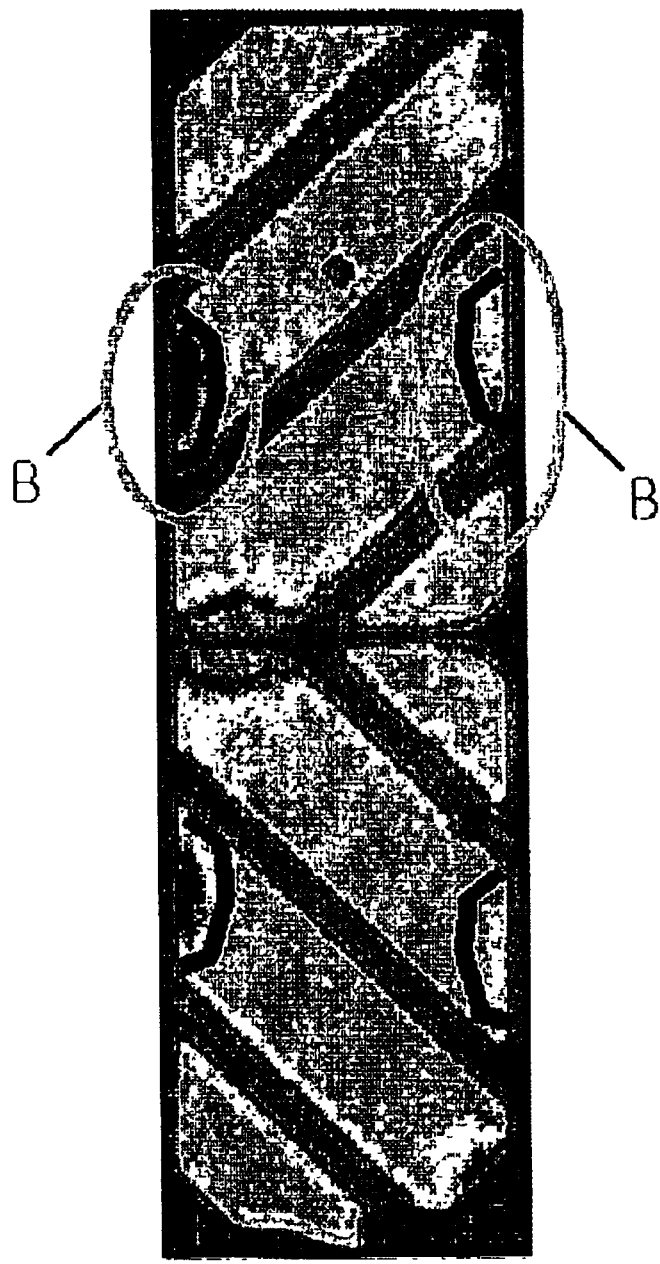

However, as the second and the third openings 420 and 430 have branches at their both ends while forming horizontal domains being in contact with the data line 70, the horizontal domains become domains where the directors of the liquid crystal molecules are inclined perpendicular to the boundary of the pixel electrode. Therefore, the fringe field at the neighboring pixel electrodes operates to serve the formation of the horizontal domains so that the texture shown in FIG. 7 or 8 is not made. As the occurrence of the texture is prevented, even if the black matrix becomes shortened in width so much as to not intercept the texture, the picture quality can be obtained in a stable manner.

As the openings 410, 420 and 430 of the common electrode 400 involve a 180 degree-rotation symmetrical structure between the neighboring pixel regions, the increase in the resistance of the common electrode 400 due to the openings 410, 420 and 430 can be compensated. The openings 410, 420 and 430 restrict the conduction passage. As the distance between the opening 410, 420 and 430 becomes shortened, the conduction passage becomes narrowed while increasing the resistance. However, in case the openings 410, 420 and 430 are arranged between the neighboring pixel regions with a 180 degree-rotation symmetrical structure, it becomes easy to maintain the distance between the opening 410, 420 and 430 by a predetermined dimension or more.

As the pixel region is formed with a small width as well as with a large width, the width of the pixel region can be easily controlled when needed while optimizing the width of the domain and the domain partitioning member. Furthermore, the number of the domain partitioning members can be minimized. In this way, the aperture ratio can be maximized.

Meanwhile, during the process of combining the TFT array panel and the color filter panel with each other, even if some degree of alignment error is made, only the dimension of the horizontal domains or the vertical domains is varied. There is little chance that texture is generated over a wide area because of not made of domain partitioning. Therefore, the available range of alignment error is expanded.

Figure 5:
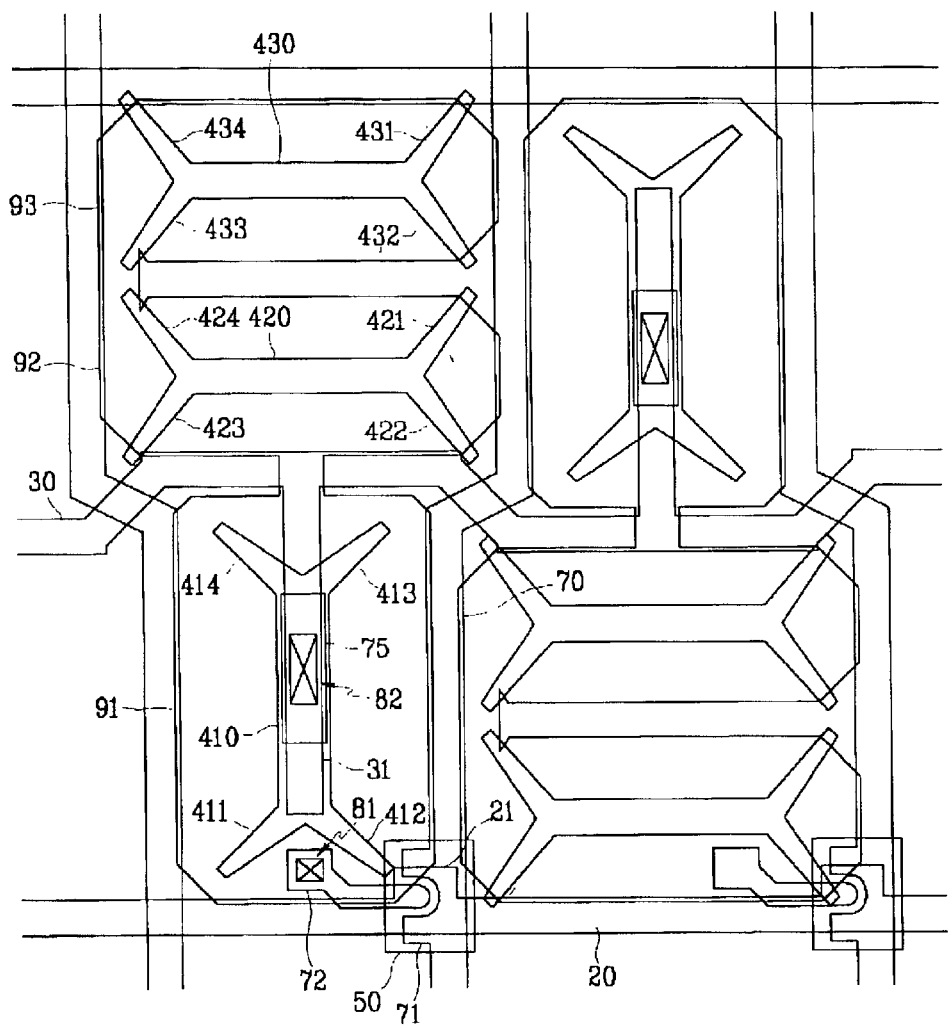
FIG. 5 illustrates a pixel electrode and a common electrode for an LCD according to a second embodiment of the present invention.

FIG. 5 illustrates a pixel electrode and a common electrode for an LCD according to a second preferred embodiment of the present invention when viewed from the front side. In this preferred embodiment, other structures and components of the LCD are the same as those related to the first preferred embodiment except that the first opening 410 of the common electrode 400 has branches 411 to 414. Therefore, the micro domains partitioned by the boundaries of the first pixel partition 91 and the first opening 410 are divided into two kinds of domains, that is, first horizontal domains and second vertical domains. The first horizontal domains have two short sides and two long sides, which extend parallel to the data line 70. The second vertical domains are partitioned by the branches 411 to 414 of the first opening 410, and the top and the bottom sides of the first pixel partition 91.

Owing to the presence of the second vertical domains, occurrence of the texture due to the fringe field formed between the two pixel electrodes 91 to 95 while interposing the gate line 20 can be prevented.

The arrangement of the openings at the pixel electrode and the common electrode may be varied in various ways, and protrusions may replace the openings.

As described above, the pixel region may bear a small width and a large width so that the domain width, the inter-domain distance and the number of domains can be optimized. Horizontal domains are arranged at the left and right sides of the vertical domains, and the vertical domains are arranged at the top and bottom sides of the horizontal domains so that occurrence of the texture due to the proximate relation of the pixel electrodes can be prevented while increasing the available range of alignment error in combining the top and the bottom panels with each other.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:

a first insulating substrate;

a plurality of first signal lines formed on the first substrate;

a plurality of second signal lines formed on the first substrate intersecting the first signal lines in an insulating manner;

a pixel electrode formed at a pixel region delimited by the intersections of the first and the second signal lines, the pixel electrode partitioned into a plurality of partitions by at least one first domain partitioning member;

a thin film transistor connected to the first and the second signal lines and to the pixel electrode;

a second insulating substrate facing the first insulating substrate; and a common electrode formed on the second insulating substrate having at least one second domain partitioning member for partitioning the plurality of partitions into a plurality of micro domains, wherein the plurality of micro domains include first and second horizontal micro domains having an average direction of long axes of liquid crystal molecules therein being generally parallel to the first signal lines, the plurality of micro domains further including a first vertical micro domain having an average direction of long axes of liquid crystal molecules therein being parallel to the second signal lines, wherein the first horizontal micro domain is disposed between the first domain partitioning member and one of the second signal lines and includes two short sides and two long sides, the long sides extending parallel to the second signal lines, wherein the first vertical micro domain is disposed between branches of the second domain partitioning member and includes two short sides and two long sides, the long sides extending parallel to the first signal lines, wherein the second horizontal micro domain is disposed at an end of the first vertical micro domain between at least one of the branches of the second domain partitioning member and one of the second signal lines.

2. The liquid crystal display of claim 1 wherein the plurality of micro domains further comprise a second vertical micro domain disposed between branches of one of the second domain partitioning members and one of the first signal lines.

3. The liquid crystal display of claim 2 wherein a distance between two neighboring second signal lines varies periodically along a length of the second signal lines, and a side of the pixel electrode proximate the second signal line has the same pattern as the second signal line such that the pixel electrode has a narrow part and a wide part, wherein the narrow part comprises the first horizontal micro domain and the second vertical micro domain and the wide part comprises the first vertical micro domain and the second horizontal micro domain.

4. The liquid crystal display of claim 1 wherein a distance between two neighboring second signal lines varies periodically with a length of the second signal lines, and the side of the pixel electrode proximate the second signal line has the same pattern as the second signal line such that the pixel electrode has a narrow part and a wide part.

5. The liquid crystal display of claim 4 wherein the narrow part of the pixel electrode comprises the first horizontal micro domain and the wide part of the pixel electrode comprises the first vertical micro domain and the second horizontal micro domain.

6. The liquid crystal display of claim 1 further comprising:
a plurality of third signal lines formed at the first substrate and intersecting the second signal lines in an insulating manner; and
a plurality of subsidiary storage capacitor electrodes overlapping the third signal lines in an insulating manner and electrically connected to the pixel electrodes.

7. The liquid crystal display of claim 6 wherein the subsidiary storage capacitor electrode overlaps the second domain partitioning member.

8. The liquid crystal display of claim 1 wherein the second domain partitioning member comprises an opening pattern formed at the common electrode, the opening pattern has a horizontal opening and a vertical opening, and the horizontal opening comprises a first section and two first branches connected to one end of the first section and two second branches connected to another end of the first section such that one of the partitions of the pixel electrode includes two first vertical domains and two second horizontal domains.

9. A liquid crystal display comprising:
a first insulating substrate;
a gate wire formed on the first insulating substrate and including a gate line and a gate electrode;
a gate insulating layer formed on the gate wire;
a semiconductor layer formed on the gate insulating layer;
a data wire formed on the semiconductor layer and including a data line, a source electrode and a drain electrode, the data line intersecting the gate line;
a protective layer formed on the data wire and having a contact hole exposing the drain electrode;
a pixel electrode formed on the protective layer, overlapping at least a portion of the data line and the gate line, and having a plurality of partitions divided by a first opening pattern;
a second insulating substrate facing the first insulating substrate;
a common electrode formed on the second insulating substrate having a second opening pattern for partitioning the plurality of partitions into a plurality of micro domains; and
a liquid crystal layer interposed between the pixel electrode and the common electrode;
wherein the plurality of micro domains comprises first and second horizontal micro domains having an average direction of long axes of liquid crystal molecules in the liquid crystal layer being generally parallel to the first signal lines, the plurality of micro domains further including a first vertical micro domain having an average direction of long axes of liquid crystal molecules therein being parallel to the second signal lines,
wherein the first horizontal micro domain is disposed between the first domain partitioning member and one of the second signal lines and includes two short sides and two long sides, the long sides extending parallel to the second signal lines,
wherein the first vertical micro domain is disposed between branches of the second domain partitioning member and includes two short sides and two long sides, the long sides extending parallel to the first signal lines,
wherein the second horizontal micro domain is disposed at an end of the first vertical micro domain between at least one of the branches of the second domain partitioning member and one of the second signal lines.

10. The liquid crystal display of claim 9 wherein the protective layer comprises a low dielectric CVD layer having a thickness of 2–4 microns.

* * * * *